US008598732B2

(12) United States Patent
Stiesdal

(10) Patent No.: US 8,598,732 B2
(45) Date of Patent: Dec. 3, 2013

(54) WIND TURBINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 512 days.

(21) Appl. No.: 13/002,823

(22) PCT Filed: Jul. 2, 2009

(86) PCT No.: PCT/EP2009/058297
§ 371 (c)(1),
(2), (4) Date: Jan. 6, 2011

(87) PCT Pub. No.: WO2010/003869
PCT Pub. Date: Jan. 14, 2010

(65) Prior Publication Data
US 2011/0115234 A1 May 19, 2011

(30) Foreign Application Priority Data
Jul. 7, 2008 (EP) ..................................... 08012253

(51) Int. Cl.
*F03D 9/00* (2006.01)
*H02P 9/04* (2006.01)

(52) U.S. Cl.
USPC ................................. 290/55; 290/54; 310/431

(58) Field of Classification Search
USPC .......................... 290/43, 44, 54, 55; 310/431
See application file for complete search history.

(56) References Cited

U.S. PATENT DOCUMENTS

| 6,483,199 | B2 | 11/2002 | Umemoto et al. | |
| 6,781,276 | B1 * | 8/2004 | Stiesdal et al. | 310/254.1 |
| 7,119,453 | B2 | 10/2006 | Bywaters et al. | |
| 7,154,193 | B2 * | 12/2006 | Jansen et al. | 290/55 |
| 7,548,008 | B2 * | 6/2009 | Jansen et al. | 310/266 |
| 7,893,555 | B2 * | 2/2011 | Casazza et al. | 290/55 |
| 7,944,076 | B2 * | 5/2011 | Stiesdal | 290/55 |
| 8,358,028 | B2 * | 1/2013 | Stiesdal | 290/55 |
| 2006/0152014 | A1 | 7/2006 | Grant et al. | |
| 2009/0134627 | A1 * | 5/2009 | Stiesdal | 290/55 |
| 2009/0134628 | A1 * | 5/2009 | Stiesdal | 290/55 |
| 2009/0134629 | A1 * | 5/2009 | Stiesdal | 290/55 |
| 2009/0134630 | A1 * | 5/2009 | Stiesdal | 290/55 |
| 2010/0045047 | A1 * | 2/2010 | Stiesdal | 290/55 |
| 2011/0062719 | A1 * | 3/2011 | Stiesdal | 290/55 |
| 2011/0109099 | A1 * | 5/2011 | Stiesdal | 290/55 |
| 2011/0110769 | A1 * | 5/2011 | Stiesdal | 415/170.1 |
| 2011/0115234 | A1 * | 5/2011 | Stiesdal | 290/55 |
| 2011/0133479 | A1 * | 6/2011 | Stiesdal | 290/55 |
| 2011/0133586 | A1 * | 6/2011 | Stiesdal | 310/90 |
| 2012/0217752 | A1 * | 8/2012 | Booth et al. | 290/55 |

FOREIGN PATENT DOCUMENTS

| DE | 44 02 184 A1 | 8/1995 |
| DE | 102 55 745 A1 | 6/2004 |
| EP | 1 394 406 A2 | 3/2004 |

(Continued)

*Primary Examiner* — Nicholas Ponomarenko

(57) ABSTRACT

A wind turbine is disclosed. The wind turbine includes a direct drive generator, which includes an inner stator arrangement and an outer rotor arrangement, a stationary outer shaft and a rotatable inner shaft having a center axis. At least two main bearings support the rotatable inner shaft inside the stationary outer shaft. The stator arrangement is arranged on the outside of the stationary outer shaft. The rotor arrangement is substantially arranged around the stator arrangement on the front side at least indirectly attached to the rotatable inner shaft and/or to the hub of the wind turbine.

15 Claims, 1 Drawing Sheet

(56) References Cited

FOREIGN PATENT DOCUMENTS

| | | |
|---|---|---|
| EP | 1 641 102 A1 | 3/2006 |
| EP | 1 925 820 A1 | 5/2008 |
| JP | 2003510492 A | 3/2003 |
| JP | 2006046107 A | 2/2006 |
| JP | 2006174523 A | 6/2006 |
| JP | 2007502382 A | 2/2007 |
| WO | 0205408 A1 | 1/2002 |
| WO | WO 02/057624 A1 | 7/2002 |
| WO | WO 03/023943 A2 | 3/2003 |

* cited by examiner

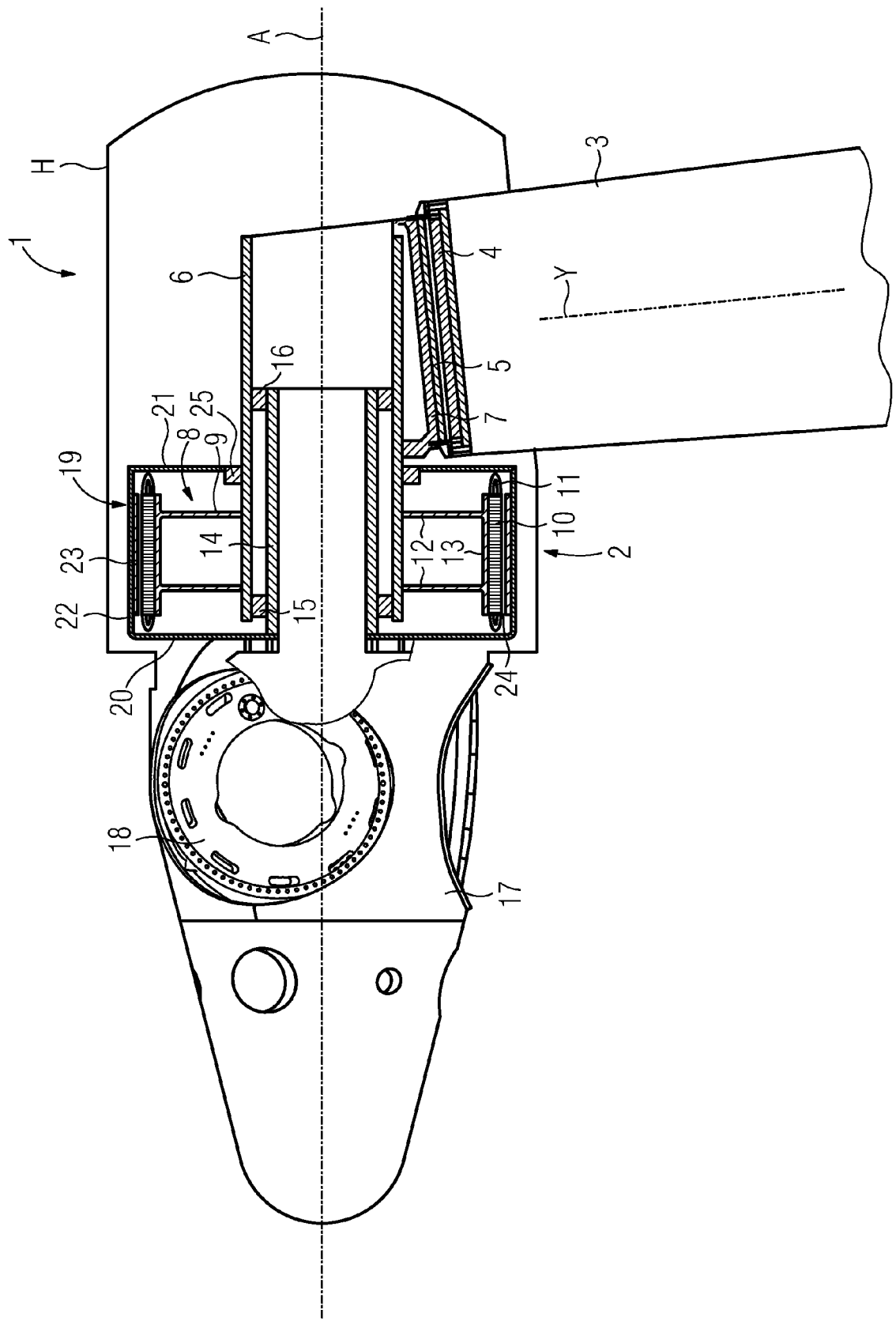

WIND TURBINE

CROSS REFERENCE TO RELATED APPLICATIONS

This application is the US National Stage of International Application No. PCT/EP2009/058297, filed Jul. 2, 2009 and claims the benefit thereof. The International Application claims the benefits of European Patent Office application No. 08012253.4 EP filed Jul. 7, 2008. All of the applications are incorporated by reference herein in their entirety.

FIELD OF INVENTION

The invention relates to a wind turbine comprising a direct drive generator.

BACKGROUND OF INVENTION

In principle there are two main types of wind turbines in view of the drive configuration of a wind turbine. The first type of a wind turbine is the more classical type of a wind turbine comprising a gearbox arranged between the main shaft and a generator of the wind turbine. The second type of a wind turbine is a gearless type comprising a direct drive or a directly driven generator. Such a direct drive generator can be made as a synchronous generator with winded rotor or with permanent magnets attached to the rotor, or it can be designed as an alternative type of a generator. Independently from the type of a direct drive generator it is desirable that the width of the air gap between the rotor and the stator of the generator is preferably maintained constantly or at least within certain tolerances during the operation of the wind turbine and the direct drive generator respectively even when the arrangement of wind turbine rotor, main shaft and direct drive generator is subject to loads.

Therefore different bearing arrangements for a drive configuration of a wind turbine comprising a direct drive generator were developed. Up to now the classical bearing arrangement of a direct drive generator is a two-bearing arrangement. Thereby the rotor of the generator which is connected to the wind turbine rotor is supported with two bearings towards a stationary inner shaft or a fixed inner shaft. The stator is on one side attached to the stationary inner shaft. Thus the rotor can turn relatively to the stator around the stationary inner shaft. Wind turbines with such a design are e.g. described in EP 1 641 102 A1 and U.S. Pat. No. 6,483,199 B2. The drawback of such a design is that the one-side support of the stator makes it difficult to maintain the width of the air gap at least substantially constant at the unsupported side of the stator in particular when the entire generator structure is not only subject to gravity and mass inertia but also to unbalanced magnetic pull. In order to reduce this drawback a direct drive generator with such a two-bearing arrangement needs a large and heavy stator support structure capable of absorbing relatively large bending moments of the stator. Such a stator support structure is e.g. described in WO 02/05408 A1 wherein the stator support structure comprises a support construction having a plenty of support arms.

In an alternative design the two-bearing arrangement is replaced with a single bearing with a stationary inner bearing part attached to a stationary inner shaft and a rotating outer bearing part supporting the rotor of the direct drive generator. Wind turbines comprising a direct drive generator with a single bearing are disclosed in US 2006/0152014 A1 and WO 02/057624 A1. But the replacement of the two bearings with a single bearing does not substantially change the drawback of the unilaterally supported stator structure.

In some further solutions the stationary inner shaft concept is replaced with a rotating shaft concept. Since the stator of the generator is supported on both sides according to the rotating shaft concept, it is easier to maintain the width of the air gap between the rotor and the stator of the generator at least substantially constantly. There are two known variants of the rotating shaft concept, one with a two-bearing arrangement and one with a four-bearing arrangement.

According to the two-bearing arrangement the bearings of the generator act as bearings of a main shaft for the wind turbine which main shaft is connected to the wind turbine rotor. The stator structure is supported towards the main shaft and attached to a bedplate of the wind turbine. Wind turbines having such a design are disclosed in U.S. Pat. No. 7,119,453 B2 and WO 03/023943 A2. A drawback of this design is that the stator structure needs to be dimensioned to absorb and transfer all wind turbine rotor loads, i.e. the weight of the wind turbine rotor and all asymmetric aerodynamic loads to maintain the width of the air gap within the necessary tolerances. On large wind turbines this leads to very heavy and expensive stator structures.

In the four-bearing arrangement the main shaft of the wind turbine which is connected to the wind turbine rotor on its one end is supported by its own two bearings and carries at its other end the direct drive generator. The direct drive generator has a two-bearing arrangement for the centring of the rotor inside the stator. An example of such a wind turbine is described in U.S. Pat. No. 6,781,276 B1. In this main shaft mounted arrangement the generator stator is carried by the generator rotor and torque is transferred from the generator to the wind turbine bedplate through a torque arm arrangement. The torque arm arrangement needs to comprise some kind of flexibility, e.g. implemented with rubber elements, to allow for minor misalignments between the main shaft-generator structure and the turbine bedplate. The bilateral support of the stator on the rotor enables for a relatively lightweight stator structure. The main drawback of this design is that a total of four bearings are required, and that the full torque has at least partially to pass through these bearings. For large wind turbines this means comparatively large and expensive bearings. Furthermore, for large wind turbines the torque arm arrangement becomes a comparatively substantial and heavy structure.

SUMMARY OF INVENTION

It is therefore an object of the present invention to provide a wind turbine as initially mentioned in such a way, that the design of the wind turbine is preferably simplified and less expensive.

This object is inventively achieved by a wind turbine comprising a direct drive generator comprising an inner stator arrangement and an outer rotor arrangement, a stationary outer shaft and a rotatable inner shaft having a centre axis, wherein at least two main bearings support the rotatable inner shaft inside the stationary outer shaft, the stator arrangement is arranged on the outside of the stationary outer shaft and the rotor arrangement is substantially arranged around the stator arrangement and on the front side at least indirectly attached to the rotatable inner shaft and/or to the hub of the wind turbine. The present invention pursues a new concept of a wind turbine with a direct drive generator wherein the stator arrangement is arranged on the outside of a stationary outer shaft and around the stationary outer shaft of the wind turbine respectively. This allows in a relatively simple way a two side support of the stator arrangement with advantages in view of the maintenance of the width of the air gap and a lightweight design of the stator arrangement as a whole. The rotor arrangement is arranged substantially around the stator arrangement and on the front side at least indirectly attached to the rotatable inner shaft, the hub or both, wherein the rotatable inner shaft is normally supported by two main bearings within the stationary outer shaft. In this way a compact and comparatively lightweight as well as a simplified and less expensive design is achieved.

According to an embodiment of the invention the rotor arrangement is on the rear side at least indirectly connected to the stationary outer shaft by a support bearing, thus a third bearing. In this way the rotor arrangement has also a two side support. According to this the required maintenance of a substantially constant width of the air gap between the stator and the rotor arrangement in particular between the elements of the stator and the rotor arrangement which are arranged oppositely to each other for the power generation is at least simplified. In this manner a two side support of the rotor and the stator arrangement is achieved by saving one bearing in comparison to the aforementioned rotating shaft concept in particular in comparison to the four-bearing arrangement. Thus the design of the wind turbine is simplified and less expensive.

Such a three bearing structure can be sometimes statically undetermined. In this case any misalignments due to mounting tolerances or any deformations arising as a result of gravity or external loads to the rotatable inner shaft, the stationary outer shaft and/or the direct drive generator as a whole could potentially lead to an uneven load distribution between the three bearings of the wind turbine which in turn could cause a premature bearing failure.

Therefore the rotor arrangement comprises according to an embodiment of the invention a front endplate which is at least indirectly attached to the rotatable inner shaft, to the hub of the wind turbine or to both. The front endplate is preferably substantially perpendicularly arranged relatively to the centre axis of the rotatable inner shaft and/or at least partially in a certain adequate extent flexible in the directions of the centre axis of the rotatable inner shaft. Thus the potential problem of a static indeterminacy of the three bearing arrangement is in case of this embodiment of the invention eliminated by establishing a sufficient flexibility of the front endplate of the rotor arrangement in the directions of the centre axis of the rotatable inner shaft. According to this the front endplate acts like a membrane supporting the rotor arrangement substantially firmly in the radial direction so as to maintain the air gap, but flexing readily so as to enable e.g. a bending of the rotatable inner shaft and the stationary outer shaft with no major resistance.

In a variant of the invention the front endplate is a ring-shaped endplate and in particular substantially flat. Preferably the front endplate is made of steel or fibreglass. According to a further variant of the invention the front endplate has a thickness of approximately 15-50 mm, preferably 20-30 mm. Thus the front endplate has such dimensions e.g. in dependence of the material and/or the structure of the front endplate that the front endplate has a comparatively little bending stiffness. It simply flexes passively when e.g. the rotatable inner shaft is shifted a bit by deflection, while at the same time maintaining the width of the air gap.

According to another embodiment of the invention the rotor arrangement comprises a rear, ring-shaped and in particular flat endplate which is at least indirectly connected to the stationary outer shaft by the support or third bearing.

According to a variant of the invention the rear endplate is also made of steel or fibreglass.

According to a further variant of the invention the rotor arrangement comprises a hollow cylinder element. As a rule this hollow cylinder element connects the front and the rear endplate to each other.

In an embodiment of the invention the rotor arrangement comprises at least one permanent magnet. Typically a plurality of permanent magnets is arranged on the cylindrical inside of the hollow cylinder element.

In a further embodiment of the invention the stator arrangement comprises a stator support structure at least indirectly attached to the stationary outer shaft and at least one lamination stack with at least one winding arranged on the stator support structure. The lamination stack with windings is oppositely arranged to the permanent magnets of the rotor arrangement with the air gap in-between. Normally the air gap has a substantially constant width of approximately 5 mm.

In a variant of the invention the stationary outer shaft is at least indirectly arranged on the bedplate of the wind turbine. Preferably the stationary outer shaft is attached to a retaining arrangement which is arranged on the bedplate.

In a further embodiment of the invention the support bearing is a four-point bearing. Such a four-point bearing is capable of transmitting high axial loads in both axial directions and therefore capable for the present three bearing arrangement.

BRIEF DESCRIPTION OF THE DRAWINGS

The invention will in the following be explained in more detail with reference to the schematic drawing showing a part of an inventive wind turbine.

The FIGURE shows schematically an embodiment of an inventive wind turbine 1 comprising a direct drive generator 2 which is arranged on the upwind side of a tower 3 of the wind turbine 1.

DETAILED DESCRIPTION OF INVENTION

A tower flange 4 is arranged on the top of the tower 3. A bedplate 5 is attached to the tower flange 4. The wind turbine 1 comprises in a not explicitly shown manner a yaw system for turning the bedplate 5 of the wind turbine 1 around the axis Y of the tower 3 together with the other components of the wind turbine 1 which are directly or indirectly attached to the bedplate 5.

The wind turbine 1 comprises a stationary outer shaft 6. The rear side of the stationary outer shaft 6 is attached to a retaining arrangement 7 which is attached to the bedplate 5. On the front side of the stationary outer shaft 6 a stator arrangement 8 of the direct drive generator 2 is arranged. The stator arrangement 8 comprises a stator support structure 9 and a lamination stack 10 with windings 11. The stator support structure 9 comprises two support elements 12 for a two side support of the lamination stack 10. In case of the present embodiment of the invention the support elements 12 are ring-shaped support elements 12 attached, e.g. bolted, to the outside of the stationary outer shaft 6. The ring-shaped support elements 12 are able to be compact or are able to comprise spokes or a spoke structure. A kind of hollow cylindrical support element 13 is attached to the outer ends of the ring-shaped support elements 12. The hollow cylindrical support element 13 carries the ring-shaped lamination stack 10 with windings 11. The lamination stack 10 is able to comprise ring segment shaped lamination stack segments each having at least one winding 11 which segments build in their entirety the lamination stack 10.

A rotatable inner shaft 14 having a centre axis A is arranged inside the stationary outer shaft 6 and rotatably supported by two main bearings 15, 16 against the stationary outer shaft 6. In case of the present embodiment of the invention the centre axis A is a joint centre axis A of the rotatable inner shaft 6 and the stationary outer shaft 14. A hub 17 is connected to the front end of the rotatable inner shaft 14 e.g. by means of bolts. The hub 17 comprises three mounting devices 18 for three not shown, but well known wind rotor blades. Thus the rotatable inner shaft 14 can turn together with the hub 17.

A rotor arrangement 19 is substantially arranged around the stator arrangement 8. In case of the present embodiment of the invention the rotor arrangement 19 comprises a front ring-shaped endplate 20, a rear ring-shaped endplate 21 and a hollow cylinder element 22 connecting the front ring-shaped endplate 20 and the rear ring-shaped endplate 21 to each other. On the inside the hollow cylinder element 22 comprises a plurality of permanent magnets 23 substantially arranged oppositely to the lamination stack 10. An air gap 24 having a width of approximately 5 mm is located between the permanent magnets 23 and the lamination stack 10.

In case of the present embodiment of the invention the front ring-shaped endplate 20 is connected e.g. bolted to the hub 17 and the rotatable inner shaft 14. The rear ring-shaped endplate 21 is connected to the stationary outer shaft 6 by means of a third bearing, a so called support bearing 25. Thus also the rotor arrangement 19 has a two side support. Moreover the rotor arrangement 19 can turn together with the hub 17 and the rotatable inner shaft 14, wherein in particular the permanent magnets 23 turn relatively to the lamination stack 10 for power generation.

For avoiding situations in which the three-bearing arrangement comprising the two main bearings 15, 16 and the support bearing 25 is statically undetermined the front endplate 20 of the rotor arrangement 19 comprises and adequate flexibility in the directions of the centre axis A. Thereby the front endplate 20 acts like a membrane supporting the rotor arrangement 19 substantially firmly in the radial direction so as to maintain the width of the air gap 24, but flexing readily so as to allow e.g. a bending of the rotatable inner shaft 14 and the stationary outer shaft 6 with no major resistance. The front endplate 20 has such dimensions that it has a comparatively little bending stiffness. It simply flexes passively when e.g. the rotatable inner shaft 14 is shifted a bit by deflection. Thus when a bending of the rotatable inner shaft 14 and the stationary outer shaft 6 which are connected to each other by means of the main bearings 15, 16 occurs the front endplate 20 bends in the directions of the centre axis A wherein the width of the air gap 24 is maintained substantially constant or within required tolerances.

The front endplate 20 is typically made of steel or fibreglass and has a thickness of approximately 15-55 mm, preferably of 20-30 mm. The rear endplate 21 of the rotor arrangement 19 is also able to be made of steel or fibreglass. Normally the rear endplate 21 has a higher thickness as the front endplate 20.

In an embodiment of the invention the support bearing is a four-point bearing capable of transmitting high axial loads in both directions of the centre axis A.

The third bearing arrangement has besides the advantages of a lightweight, relatively simple and less expensive design the additional advantage over existing designs of wind turbines that it provides the preconditions for a well-defined sealing arrangement in particular when the direct drive generator 2 is located on the upwind side of the tower. Thereby a substantially total enclosure of the generator 2 is easier to establish which is particularly of importance for an application offshore and in other problematic environments.

By the way the described wind turbines 1 comprise a housing H normally called the nacelle.

The invention claimed is:

1. A wind turbine, comprising:
   a hub;
   a rotatable inner shaft having a centre axis;
   a stationary outer shaft;
   a direct drive generator, comprising:
      an inner stator arrangement arranged on the outside of the stationary outer shaft, and
      an outer rotor arrangement which is substantially arranged around the inner stator arrangement and at least indirectly attached to a front side of the rotatable inner shaft and/or to the hub; and
   a plurality of main bearings support the rotatable inner shaft inside the stationary outer shaft.

2. The wind turbine according to claim 1, wherein a rear side of the outer rotor arrangement is at least indirectly connected to the stationary outer shaft on by a support bearing.

3. The wind turbine according to claim 1,
   wherein the outer rotor arrangement comprises a front endplate which is at least indirectly attached to the rotatable inner shaft and/or to the hub of the wind turbine, and
   wherein the front endplate is flexible in a direction of the centre axis of the rotatable inner shaft.

4. The wind turbine according to claim 3, wherein the front endplate is a ring-shaped endplate.

5. The wind turbine according to claim 3, wherein the front endplate is made of steel or fibreglass.

6. The wind turbine according to claim 3, wherein the front endplate has a thickness of approximately 15-50 mm.

7. The wind turbine according to claim 2, wherein the outer rotor arrangement comprises a rear, ring-shaped endplate which is at least indirectly connected to the stationary outer shaft by the support bearing.

8. The wind turbine according to claim 7, wherein the rear endplate is made of steel or fibreglass.

9. The wind turbine according to claim 1, wherein the outer rotor arrangement comprises a hollow cylinder element.

10. The wind turbine according to claim 9,
    wherein the outer rotor arrangement comprises a front endplate which is at least indirectly attached to the rotatable inner shaft and/or to the hub of the wind turbine,
    wherein the front endplate is flexible in a direction of the centre axis of the rotatable inner shaft,
    wherein the outer rotor arrangement comprises a rear, ring-shaped endplate which is at least indirectly connected to the stationary outer shaft by the support bearing, and
    wherein the hollow cylinder element connects the front endplate to the rear endplate.

11. The wind turbine according to claim 1, wherein the outer rotor arrangement comprises at a permanent magnet.

12. The wind turbine according to claim 1, wherein the stator arrangement comprises a stator support structure and a lamination stack with a winding arranged on the stator support structure.

13. The wind turbine according to claim 1, wherein the stationary outer shaft is at least indirectly arranged on a bedplate of the wind turbine.

14. The wind turbine according to claim 13, wherein the stationary outer shaft is attached to a retaining arrangement which is arranged on the bedplate.

15. The wind turbine according to claim 2, wherein the support bearing is a four-point bearing.

* * * * *